Oct. 6, 1964
D. E. GUSTAFSON
3,152,210
WIDE ANGLE ATTACHMENT
Filed May 1, 1961
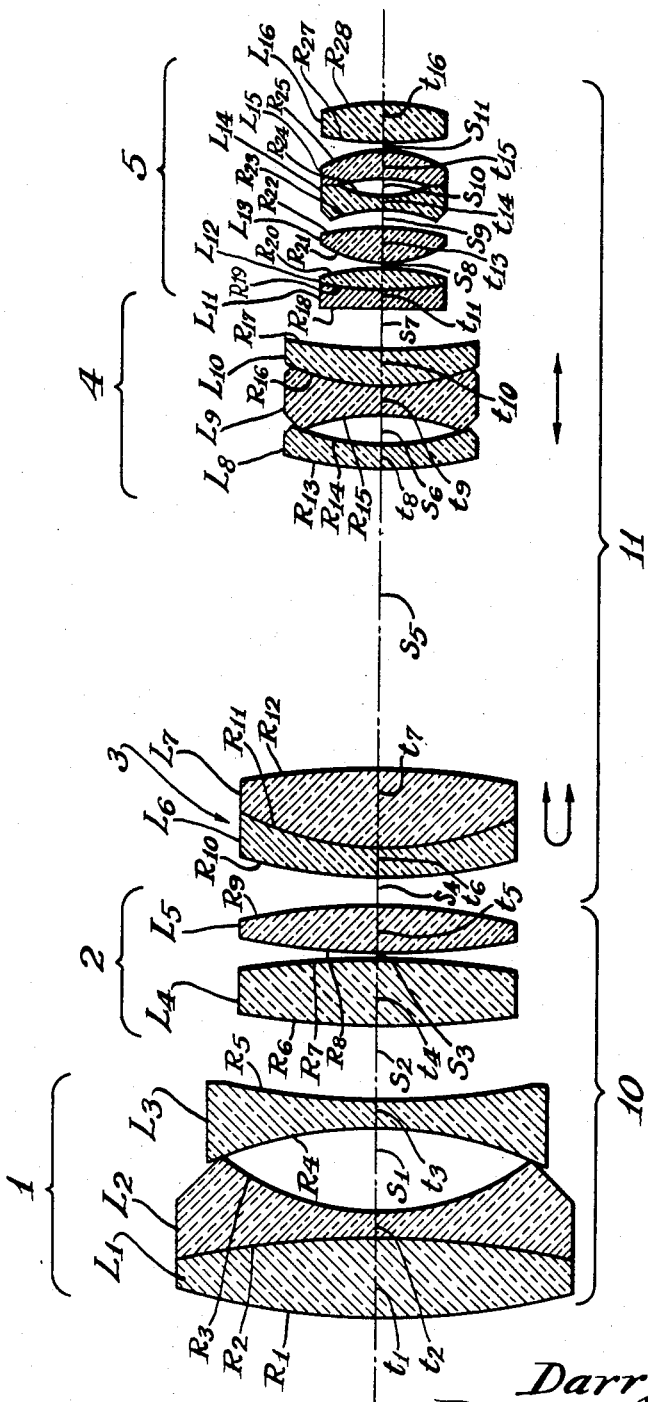
Inventor:
Darryl E. Gustafson
By Robert F. Michler, Atty.

United States Patent Office 3,152,210
Patented Oct. 6, 1964

3,152,210
WIDE ANGLE ATTACHMENT
Darryl E. Gustafson, Glenview, Ill., assignor to Bell & Howell Company, Chicago, Ill., a corporation of Illinois
Filed May 1, 1961, Ser. No. 106,692
1 Claim. (Cl. 88—57)

This invention relates to a wide angle attachment for a zoom lens, and more particularly to a wide angle attachment for use with a zoom lens and corrected over the entire range of adjustment of the zoom lens.

An object of the invention is to provide an afocal wide angle attachment for a zoom lens to increase the magnification range of the zoom lens.

Another object of the invention is to provide a wide angle attachment for use with a zoom lens having a stop and highly corrected for the apparent shifting of the stop when the zoom lens is adjusted.

Another object of the invention is to provide a wide angle attachment having a front negative group including a negative meniscus front component and a negative second component along with a rear positive component.

It is to be understood that the terms "front" and "rear" as herein used refer to the left and right ends of the attachments respectively and to the ends of the objectives respectively nearer the longer and shorter conjugates thereof.

A complete understanding of the invention may be obtained from the following detailed description of wide angle attachments and zoom objectives forming specific embodiments thereof, when read in conjunction with the appended drawings; in which the single figure is a longitudinal section of a wide angle attachment and a zoom lens which together form one embodiment thereof.

The invention provides an afocal wide angle attachment for a zoom lens in which the attachments are corrected over ranges of adjustment of the zoom lenses. Each of the attachments includes a negative front lens group and a positive rear group or member. The front lens group comprises an achromatized negative meniscus front component and a biconcave lens positioned therebehind. The rear group or member comprises a plurality of positive singlets. The attachment is highly corrected for use with a zoom lens in which the apparent positions of the stop therein shifts during zooming.

Referring now in detail to the drawings, there is shown in the figure a highly corrected afocal wide angle attachment 10 adapted for use with a zoom lens 11 when the lens is in any of its zooming positions. The attachment 10 comprises a negative front lens group or member 1 and a positive rear member 2. The front group has an achromatic, negative meniscus front component consisting of lenses $L_1$ and $L_2$ and closely spaced biconcave second and rear singlet components $L_3$, the front component being concave to the rear. The positive member 2 consists of two closely spaced biconvex singlets $L_4$ and $L_5$ spaced substantially from the front lens group. The lenses $L_1$ to $L_5$ have spherical optical surfaces or radii of curvature $R_1$ to $R_9$, axial thicknesses $t_1$ to $t_5$ and axial separations $s_1$ to $s_3$.

The attachments 10 is designed to be mounted in front of a zoom lens or objective 11 with an axial separation $s_4$, and the zoom objective 11 includes a front lens group 3 adjustable for focusing and movable non-linearly for focus compensation during zooming, a linearly movable lens group 4, a positive rear lens group 5, and a stop or diaphragm (not shown) being positioned between the member 4 and lens group 5. The zoom lens 11 includes lenses $L_6$ to $L_{16}$ having spherical optical surfaces of radii of curvature $R_{10}$ to $R_{28}$, axial thickness $t_6$ to $t_{16}$ and axial separations $s_5$ to $s_{11}$. During zooming the lens group 5 and stop are fixed relative to the focal plane which is positioned to the rear of the lens group 5, the the group 4 is moved linearly in one direction and the lens member 3 is moved non-linearly. The zoom lens 11 is shown in its extreme telephoto adjustment, for which position the attachment 20 substantially increases the field covered, the attachment having a negative magnification of about 1.4.

A preferred embodiment of the attachment 10 is constructed in conformity with the following table in which dimensions are in terms of inches, and the indices of refraction for the sodium D line and the Abbe dispersion numbers are respectively designated at $n_d$ and V:

| | | | | |
|---|---|---|---|---|
| $L_1$ | $R_1=+2.857$ | $t_1=.300$ | $n_d=1.720$ | $V=29.3$ |
| | $R_2=-3.636$ | | | |
| $L_2$ | | $t_2=.100$ | $n_d=1.523$ | $V=58.6$ |
| | $R_3=+.971$ | | | |
| | | $s_1=.350$ | | |
| | $R_4=-1.429$ | | | |
| $L_3$ | | $t_3=.100$ | $n_d=1.689$ | $V=30.9$ |
| | $R_5=+3.846$ | | | |
| | | $s_2=.300$ | | |
| | $R_6=+3.704$ | | | |
| $L_4$ | | $t_4=.225$ | $n_d=1.620$ | $V=60.3$ |
| | $R_7=-2.222$ | | | |
| | | $s_3=.005$ | | |
| | $R_8=+25.000$ | | | |
| $L_5$ | | $t_5=.200$ | $n_d=1.620$ | $V=60.3$ |
| | $R_9=-3.871$ | | | |
| | | $s_4=.100$ | | |

For high correction, the attachment 10 should be constructed in substantial compliance with the following inequalities:

$$.13 < \frac{\text{Power of doublet } L_1-L_2}{\text{Power of member 1}} < .25$$

$$0 < \frac{\text{Power of surface } R_9}{\text{Power of member 2}} < .30$$

A preferred form of the zoom lens 11 is constructed in conformity with the following table in which dimensions are in terms of inches, and the indices of refraction for the sodium D line and the Abbe dispersion numbers are respectively designated at $n_d$ and V:

[Equivalent focal length .254 Wide angle, .3556 Mean, .508 Telephoto. Back focal length .382. Aperture f/1.8]

| | | | | |
|---|---|---|---|---|
| $L_6$ | $R_{10}=+2.004$ | $t_6=.090$ | $n_d=1.6885$ | $V=30.9$ |
| | $R_{11}=-1.000$ | | | |
| $L_7$ | | $t_7=.250$ | $n_d=1.6161$ | $V=55.0$ |
| | $R_{12}=-12.674$ | | | |
| | | $s_5\begin{cases}=.890 \text{ Wide angle}\\=.550 \text{ Mean}\\=.094 \text{ Telephoto}\end{cases}$ | | |
| | $R_{13}=+2.737$ | | | |
| $L_8$ | | $t_8=.070$ | $n_d=1.6106$ | $V=58.8$ |
| | $R_{14}=+.891$ | | | |
| | | $s_6=.110$ | | |
| | $R_{15}=-1.379$ | | | |
| $L_9$ | | $t_9=.070$ | $n_d=1.6106$ | $V=58.8$ |
| | $R_{16}=+1.000$ | | | |
| $L_{10}$ | | $t_{10}=.120$ | $n_d=1.7197$ | $V=29.3$ |
| | $R_{17}=+12.231$ | | | |
| | | $s_7\begin{cases}=.1245 \text{ Wide angle}\\=.622 \text{ Mean}\\=.9565 \text{ Telephoto}\end{cases}$ | | |
| | $R_{18}=+31.920$ | | | |
| $L_{11}$ | | $t_{11}=.060$ | $n_d=1.6885$ | $V=30.9$ |
| | $R_{19}=+1.818$ | | | |
| $L_{12}$ | | $t_{12}=.060$ | $n_d=1.6106$ | $V=58.8$ |
| | $R_{20}=-1.818$ | | | |
| | | $s_8=.005$ | | |
| | $R_{21}=+.360$ | | | |
| $L_{13}$ | | $t_{13}=.116$ | $n_d=1.700$ | $V=47.8$ |
| | $R_{22}=\text{Plano}$ | | | |
| | | $s_9=.074$ | | |
| | $R_{23}=-.414$ | | | |
| $L_{14}$ | | $t_{14}=.042$ | $n_d=1.751$ | $V=27.7$ |
| | $R_{24}=+.470$ | | | |
| | | $s_{10}=.036$ | | |
| | $R_{25}=-1.059$ | | | |
| $L_{15}$ | | $t_{15}=.097$ | $n_d=1.651$ | $V=55.8$ |
| | $R_{26}=-.344$ | | | |
| | | $s_{11}=.007$ | | |
| | $R_{27}=+.7135$ | | | |
| $L_{16}$ | | $t_{16}=.111$ | $n_d=1.651$ | $V=55.8$ |
| | $R_{28}=-.787$ | | | |

While the invention is thus described, it is not wished to be limited to the precise details described, as changes may be readily made without departing from the spirit of the invention.

What is claimed is:

In a wide angle attachment, proceeding from front to rear, a negative meniscus cemented doublet front component, a biconcave singlet second component, a biconvex singlet third component, and a biconvex singlet fourth component and being further characterized in that the attachment conforms substantially to the following table in which dimensions are in terms of inches, and proceeding from front to rear $L_1$ to $L_5$ designate the lenses, $R_1$ to $R_9$ the radii of curvature of the surfaces, $t_1$ to $t_5$ the axial thicknesses, $s_1$, $s_2$ and $s_3$ the axial separations, $n_d$ the indices of refraction for the sodium D line and V the Abbe dispersion numbers:

| | | | | |
|---|---|---|---|---|
| $L_1$ | $R_1=+2.857$ | $t_1=.300$ | $n_d=1.720$ | $V=29.3$ |
| | $R_2=-3.636$ | | | |
| $L_2$ | $R_3=+.971$ | $t_2=.100$ | $n_d=1.523$ | $V=58.6$ |
| | | $s_1=.350$ | | |
| $L_3$ | $R_4=-1.429$ | $t_3=.100$ | $n_d=1.689$ | $V=30.9$ |
| | $R_5=+3.846$ | | | |
| | | $s_2=.300$ | | |
| | $R_6=+3.704$ | | | |
| $L_4$ | $R_7=-2.222$ | $t_4=.225$ | $n_d=1.620$ | $V=60.3$ |
| | | $s_3=.005$ | | |
| | $R_8=+25.000$ | | | |
| $L_5$ | $R_9=-3.871$ | $t_5=.200$ | $n_d=1.620$ | $V=60.3$ |

References Cited in the file of this patent

UNITED STATES PATENTS 2,789,463   Kohler et al. _____ Apr. 23, 1957
2,944,464   Rosin _____ July 12, 1960